United States Patent [19]

Coulter et al.

[11] Patent Number: 4,707,697
[45] Date of Patent: Nov. 17, 1987

[54] HIGH RESOLUTION NONCOHERENT RADAR IMAGER

[75] Inventors: Thomas R. Coulter, Ontario, Calif.; Philip O. Isaacson, Chanhassen; Edwin C. Thiede, Plymouth, both of Minn.

[73] Assignee: Honeywell Inc., Minneapolis, Minn.

[21] Appl. No.: 858,812

[22] Filed: May 2, 1986

[51] Int. Cl.$^4$ .............................................. G01S 13/89
[52] U.S. Cl. ...................................... 342/25; 342/159; 342/196; 342/90
[58] Field of Search .......... 342/25, 159, 179, 160–164, 342/194–197, 200, 201, 64, 26

[56] References Cited

U.S. PATENT DOCUMENTS

| | | | |
|---|---|---|---|
| 3,975,734 | 8/1976 | Payne | 342/25 |
| 4,019,179 | 4/1977 | Sivertson, Jr. | |
| 4,164,740 | 8/1979 | Constant | |
| 4,222,050 | 9/1980 | Kiuchi et al. | |
| 4,268,828 | 5/1981 | Cribbs et al. | |
| 4,490,719 | 12/1984 | Botwin et al. | 342/64 |
| 4,538,149 | 8/1985 | Wehner | 342/25 X |
| 4,547,775 | 10/1985 | Wehner et al. | 342/25 X |

Primary Examiner—T. H. Tubbesing
Assistant Examiner—Bernarr Earl Gregory
Attorney, Agent, or Firm—Orrin M. Haugen; Thomas J. Nikolai; Frederick W. Niebuhr

[57] ABSTRACT

In accordance with a first arrangement, a non-coherent, pulse radar transmitter emits N-sequential signals of differing frequencies at predetermined time intervals, the transmitted pulses being directed toward a given target area of interest. Further included is a radar receiver for detecting and processing the composite radar return signal samples of N differing frequencies which are reflected from a plurality of point scatterers located in the area of interest. The varying D.C. interference signal of the plural radar return signal samples occasioned by the differing frequencies are detected and a one-dimensional Fourier transformer is performed on that composite radar return signal samples to facilitate target identification. A programmed processor is used to dervie a plurality of feature characteristics from the Fourier transform of the detected radar return signals and the features so computed are compared with features characteristic of known potential targets on a best-match basis. In accordance with an alternative embodiment, a system is provided which can extract two-dimensional, high-resolution information from radar return signals in which the non-coherent pulse radar means is moved from one location to another with respect to a target area of interest while transmitting N-sequential signals of differing frequencies at predetermined time intervals. The radar receiver is positioned to detect and range gate composite radar return signal samples reflected from a plurality of point scatterers and once a time varying D.C. interference signal is detected, a two-dimensional Fourier transformation is performed on that composite signal.

9 Claims, 15 Drawing Figures

ANGLE STEP SAMPLES

FREQUENCY STEP SAMPLES

DETECTED RADAR VIDEO SIGNAL

Fig. 7b

CROSS RANGE

RANGE

TWO DIMENSIONAL DISCRETE FOURIER TRANSFORM OF DETECTED VIDEO SIGNAL

HIGH RESOLUTION NONCOHERENT RADAR IMAGER

BACKGROUND OF THE INVENTION

I. Field of the Invention:

This invention relates generally to radar detection apparatus, and more particularly to an apparatus and method for extracting high resolution information from radar return signals, whereby a target can be readily discriminated in a high clutter background to the extent that the target is susceptible of classification.

II. Discussion of the Prior Art:

In modern weaponry, there is a need for a "seeker" on a missile or projectile which can home in on a target and guide the missile or projectile to it. Such a seeker must operate in all weather conditions as well as in the presence of high levels of smoke and dust particles. Applicants' assignee has demonstrated that millimeter wave radar (MMW radar) can be embodied in such seekers to detect and track practical targets in low to moderate ground clutter conditions.

A major problem with MMW radar-based seekers is the degradation of the target discrimination capability where the ground clutter is more than what can be considered "moderate". More particularly, high clutter levels tend to result in excessive false-alarm rates where the MMW radar seekers depend only upon contrast differences to identify the presence of a target within the background clutter.

All weather MMW radar terminal guidance seekers have been under development for several years. It is a requirement of such seekers that they operate in a lock-on-after-launch mode to permit maximum operational flexibility. During the autonmous search and acquistion period, the signal processor involved must look at many radar returns from high clutter sources or from other non-target objects which, of course, must be rejected by the signal processor. It has been found that standard contrast detection processing is inadequate to ensure target discrimination in a high clutter environment. A normal MMW radar exhibits a resolution which is larger than many of the enemy targets to be destroyed. For example, a radar-based seeker of the prior art may typically have a resolution on the order of 10 meters. Such a resolution factor is insufficient to adequately select a man-made target, such as a tank or other weapons carrier, from the background and clutter which may surround the vehicle target in question.

OBJECTS

It is accordingly a principal object of the present invention to use a low-cost noncoherent radar, as opposed to an inertial reference-based coherent radar, to significantly improve the resolution beyond a single pulse length and beyond one beamwidth.

Another object of the present invention is to provide a signal processing system and method of operating same whereby the discrimination between valid targets in a high-clutter background can be achieved utilizing less complex non-coherent radar transmitting/receiving apparatus.

Still another object of the invention is to provide an apparatus and method for increasing the resolution of a millimeter wave radar to the point where the target may not only be discriminated from background noise (clutter) but classified as well.

A further object of the invention is to provide a means whereby high resolution information may be extracted from millimeter wave radar return signals by first generating one-dimensional high-range resolution signatures and subsequently extending such signatures to two spatial dimensions (range and cross-range) using a noncoherent radar.

SUMMARY OF THE INVENTION

In carrying out the method and in employing the apparatus of the instant invention, a noncoherent pulsed radar is used to transmit and receive a millimeter wave signal. As the radar antenna beam is scanned over the search area, a contrast detection scheme is used to alert a seeker to a potential target. The contrast detection enables a first procesor, referred to herein as the Super Target Resolution (STAR) processor, which functions to extract a one-dimensional STAR signature, measures the essential features of that signature and examines those measurements to determine if the object is a target or a clutter. Assuming that a positive target determination is made by the STAR processor, the seeker is enabled to provide guidance information to the missile or projectile.

In a further expansion, a positive target determination by the STAR processor enables a second processor referred to herein as the Non-coherent Synthetic Aperture Radar (NSAR) processor, which generates a two-dimensional NSAR signature image from radar data collected during a short angular movement of the seeker relative the candidate target. The NSAR processor extracts the essential feature mesurements and then analyzes these measurements to arrive at a target/non-target decision. The NSAR processor may also be used to classify the target, e.g., armored vs. non-armored vehicles. Again, once a determination has been made that a target of interest is present, the seeker enters a track mode to provide weapon guidance.

The various objects and advantages of the invention as well as the construction and mode of operation of the preferred embodiment thereof will become apparent from the following detailed description of a preferred embodiment, especially when considered in conjunction with the accompanying drawings in which like numerals in the several views refer to corresponding parts.

DISCUSSION OF THE PRESENT INVENTION

Figure 1:
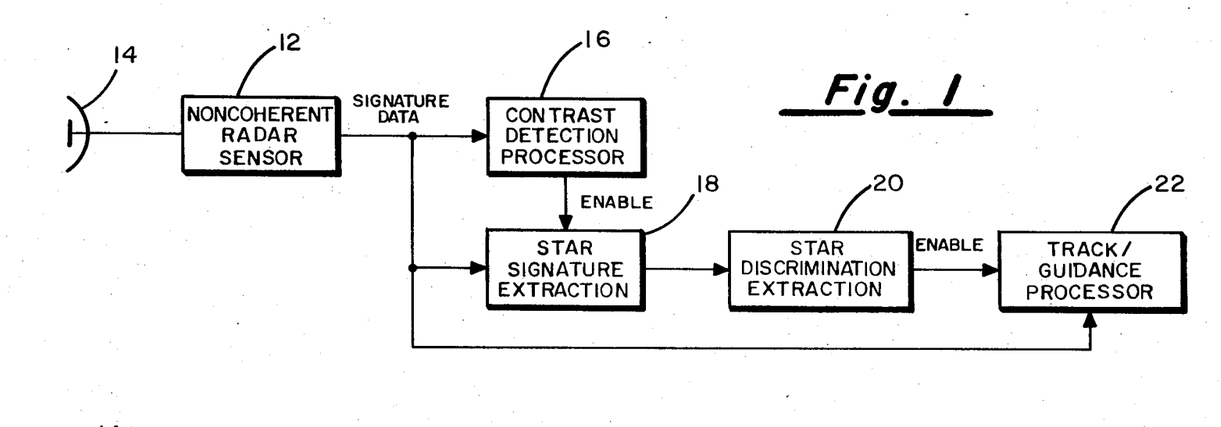
FIG. 1 is a general block diagram of one embodiment of the invention.

In accordance with a first embodiment of the invention, target discrimination in the presence of high ground clutter is enhanced while employing a noncoherent pulse radar 12 to transmit and receive a millimeter wave signal. As the radar beam from the antenna 14 is scanned over a search area, the returns are first presented to a contrast detection processor 16 in the seeker system 10 to determine the possible presence of a potential target. Specifically, if a potential target is discerned, the contrast detection processor provides an enable to the Super TArget Resolution (STAR) processor 18, which, as will be explained in greater detail below, extracts a one-dimensional STAR "signature" and measures the essential features of that signature to establish if the object is a target or clutter. This latter operation is accomplished in the STAR discrimination processor 20. In the embodiment of FIG. 1, a positive target decision at this point enables the seeker's track guidance processor 22, which then functions to generate guidance information which the missile or projectile uses to home on the target.

As mentioned in the introductory portion of the specification, the acronym "STAR" refers to a signal processing system capable of extracting one-dimensional fine target structure information from a MMW noncoherent radar return. It provides an enhanced discrimination capability over prior art contrast detection algorithms, such that valid targets can be selected while non-target objects and background clutter are rejected. The so-called STAR processing extends the resolution of the system to the subrange gate level and functions to exploit fine-structure spatial information embedded in the radar returns.

The STAR signature alluded to above is actually the autocorrelation of a high resolution range profile signature. It is the result of interference effects between the returns from individual scatterers as the frequency of the emitted radar signal is varied under a controlled modulation scheme. As will be explained in considerable detail below, the interference patterns created by the returns from multiple scatterers produce resonant frequencies in the radar video signal that are proportional to the range spacing between the scatterers as well as to the radar's transmitted frequency. The STAR signature itself is generated by performing a Fourier transform on the detected radar video signal.

It can be shown that the range resolution capability of the overall process, $\Delta R$, is inversely proportional to the bandwidth of the modulating signal and can be expressed mathematically as:

$$\Delta R = c/(2B) \qquad 1.$$

where
  B = modulation signal bandwidth
  c = speed of light

Thus, for example, a 500 MHz modulation bandwidth provides a range resolution of 0.3 meters or approximately 1.0 ft.

Once the STAR signatures are derived, certain pattern recognition techniques 20 are then applied to them to provide target discrimination capability. These pattern recognition algorithms function to analyze the fine target structure information contained in the signature to enhance the discrimination of valid targets from natural clutter and/or other non-target objects scanned by the radar beam.

The STAR signature extraction module 18 in FIG. 1 comprises a noncoherent radar signal processing technique. It offers a significant advantage over known coherent techniques that generally require more elaborate radio frequency hardware. It has been found that the noncoherent radar processing technique yields sufficient target information whereby the necessary target discrimination results.

Figure 2:
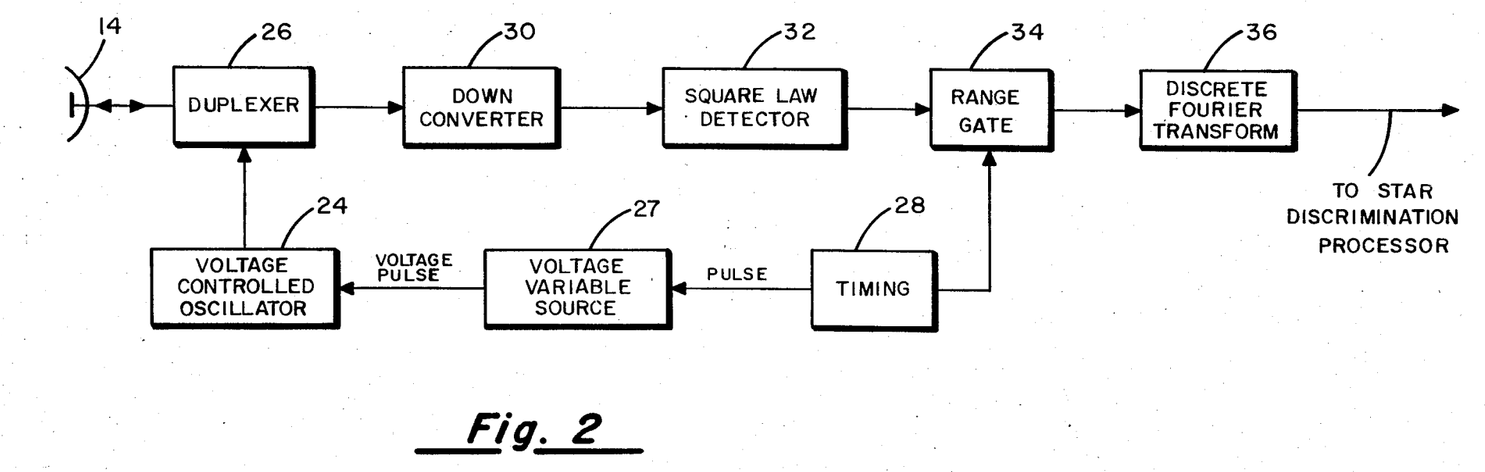
FIG. 2 is a block diagram of the noncoherent radar portion of the embodiment of FIG. 1.

A pulsed polyfrequency noncoherent radar apparatus is represented by the block diagram of FIG. 2. It is understood, however, that other radio frequency sensor methods, such as frequency modulated continuous wave and chirped pulse techniques, may also be used to generate the STAR signatures and, hence, no limitation to the arrangement shown in FIG. 2 is intended. The pulsed polyfrequency noncoherent radar includes an antenna 14 which receives a series of N short pulses, each at a different frequency, from a voltage-controlled oscillator 24, via a duplexor module 26. N is an integer greater than or equal to the ratio of radar pulse length in meters to the resolution capability ($\Delta R$) in meters. The pulses occur at a desired radar pulse repetition frequency under control of a voltage variable source 27 driven by the timing circuit 28. The radar returns or echoes are returned through the duplexor 26 and fed through a down converter 30, which functions to convert the incoming frequency to a lower intermediate frequency. The resulting output from the down converter 30 is then applied to a square law detector 32, which removes the modulating envelope from the RF carrier and produces a D.C. signal varying in accordance with the envelope. The waveform so detected is then fed through a range gate circuit 34, which limits the range extent of the STAR signature. The STAR signature, itself, is generated by taking a Fourier transform over the N different frequency samples appearing at the output of the range gate. This Fourier transform is carried out as indicated by the block 36 of FIG. 2. The resulting STAR signature is then passed to the STAR discrimination processor 20 of FIG. 1, which is programmed to perform a pattern recognition function and to ultimately make the discrimination decision as to whether a target is present in the background clutter.

Figure 3:
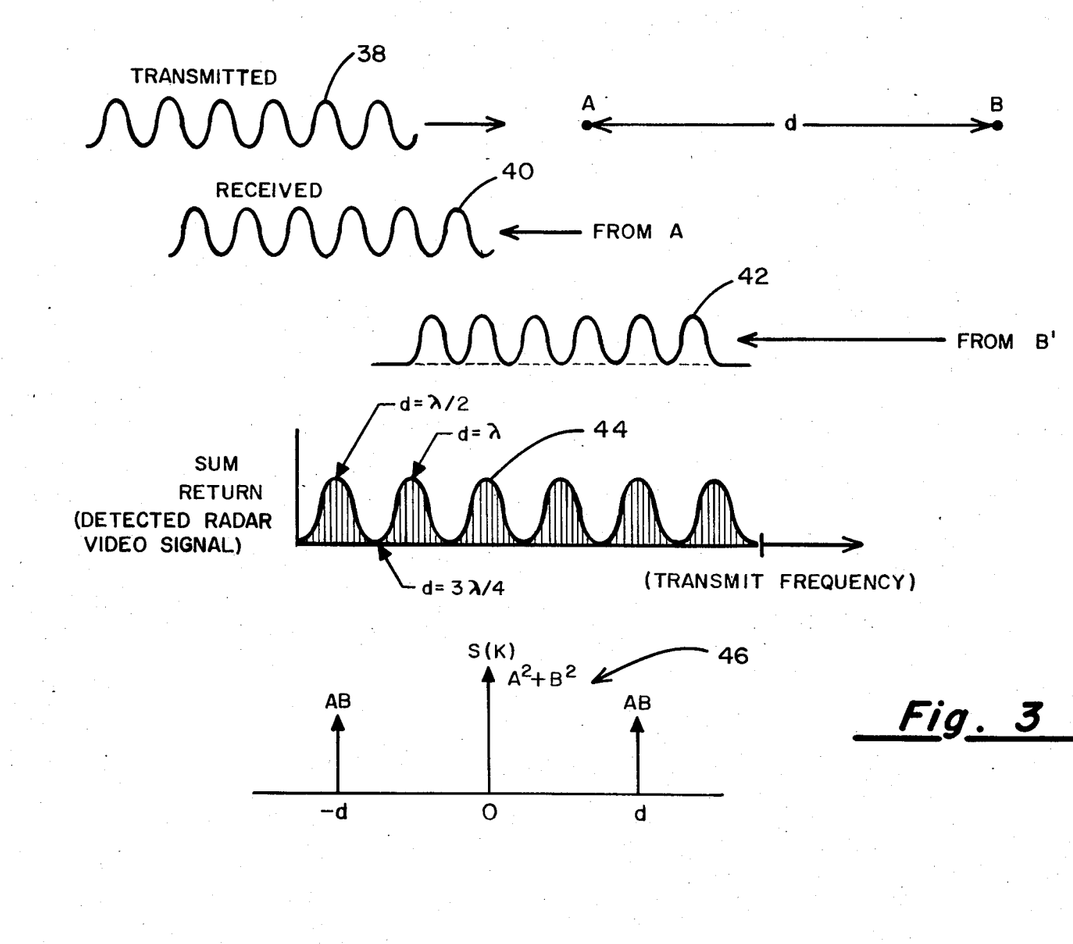
FIG. 3 illustrates by means of a series of waveforms the transmitted radar signal and the signals returned from two point scatterers of a target in the frequency domain and a vector respresentation of the Fourier transform thereof.

To better understand the manner in which the STAR signature generation process represented by block 18 in FIG. 1 is carried out, reference is first made to the simplified diagram of FIG. 3, which shows only two scatterers A and B separated by a distance d which are being scanned by a noncoherent radar signal represented by waveform 38. In actual use, a target would be expected to involve many more than only two scatterers. The reflected radar signals from scatterers A and B are respectfully identified by numerals 40 and 42 and will add constructively or destructively (coherently) in space depending upon the RF wavelength and the spacing, d. In particular, when the distance d corresponds to an odd multiple of the wavelength of the transmitted signal, the waves 40 and 42 interfere, but when d is a multiple of a half wavelength, the returns 40 and 42 re-enforce one another. As the RF frequency of the transmitted radar signal is varied, the amplitude of the detected signal varies sinusoidally to produce a waveform such as represented by numeral 44 in FIG. 3. A Fourier transform of the sequence 44 produces the ultimate STAR signature 46.

To better understand the nature of the processing tasks carried out by the STAR signature extraction module 18 of FIG. 1, the following mathematical derivation is presented.

First, the pulsed polyfrequency transmission sequence can be expressed as:

$$a \cos(w_1 t), a \cos(w_2 t) \ldots, a \cos(w_N t) \quad\quad 2.$$

$$w_i = 2\pi f_i$$

where $f_1$ to $f_N$ typically varies over 500 MHz. Each pulse is relatively short, on the order of 50 to 100 nanoseconds.

The received transmissions 40 and 42 (FIG. 3) may be expressed as:

$$A \cos(w_1 t) + B \cos(w_1(t+q)), A \cos(w_2 t) + B \cos(w_2(t+q)), \text{etc.} \quad 3.$$

where $q = 2d/c$, and
where $c$ = speed of light

The noncoherent video detector 32 converts the pulse returns, in some selected range gate, to the following amplitude sequence:

$$S(f_i) = |A \cos(w_i t) + B \cos(w_i(t+q))|^2 \quad\quad 4$$
$$= A^2 + B^2 + 2AB \cos(w_i q).$$

where $i = 1, 2, \ldots N$

This last equation represents the N point sequence represented by waveform 44 in FIG. 3. The Fourier transform of this sequence provides the final STAR signature which is referred to as S(k) and is identified generally by numeral 46 in FIG. 3. It is to be noted with reference to this Fourier transform representation that the spacing, d, and the relative strength, AB, are features of this signature. Widely spaced scatterers produce a higher oscillation or resonance frequency and a wider spacing d in the S(k) signature. More particularly, the amplitudes AB are proportional to the square root of the scatterer radar cross-section. When A is less than B or B is less than A, the side peaks are reduced accordingly. Thus, it can be seen that the STAR signature S(k) is an autocorrelation function of the two point target. It can also be shown mathematically that the resonance frequency is precisely the range spacing between the two scatters. Specifically, by taking the equation for the sinusoidal representation of the STAR signature $S(f_i)$, supra, and recognizing that $q = 2d/c$, the phase argument is $\phi = 2\pi f q$ and the resonance frequency is:

$$f_s = \frac{1}{2\pi} \cdot \frac{d\phi}{df} = q = 2d/c. \quad\quad 5$$

When the propagation factor c/2 is scaled out of this equation, the resonance frequency reduces to $$f_s = d. \quad\quad 6.$$

The purpose of presenting the foregoing derivation is to establish the fundamental concept of the STAR signature and to show the relationship between resonances (peaks) in the STAR signature and physical scatterer separations on the target. While the mathematical presentation set out above assumed that the target had only two scatterers, it is to be understood that actual targets of interest are generally far more complex, involving many scatterers, and that the STAR signatures are correspondingly more complex. The computations relating to such complex targets are, however, well within the capabilities of current microprocessor technology.

Having described how the STAR signature is extracted from the radar returns from multiple scatterers, consideration will next be given to the computational functions performed by the STAR discrimination processor which, generally speaking, discerns the distance and amplitude characteristics of multiple STAR signatures which are shown to be directly related to the physical structure of the target itself. It has been found that a STAR signature is equivalent to the autocorrelation of the target's radar cross-section range profile. The radar cross-section is, in turn, a measure of the reflective strength of the target. When the profile of the 2 point target A and B in FIG. 3 is correlated, it produces the STAR signature identified by numeral 46. By knowing that the STAR signature is equivalent to the autocorrelation of the target range profile, the ability to select features for target discrimination is enhanced. Specifically, only those features pertaining to the structure of the target need be used while unrelated features can be excluded.

Figures 4A, 4B, 5, 6:
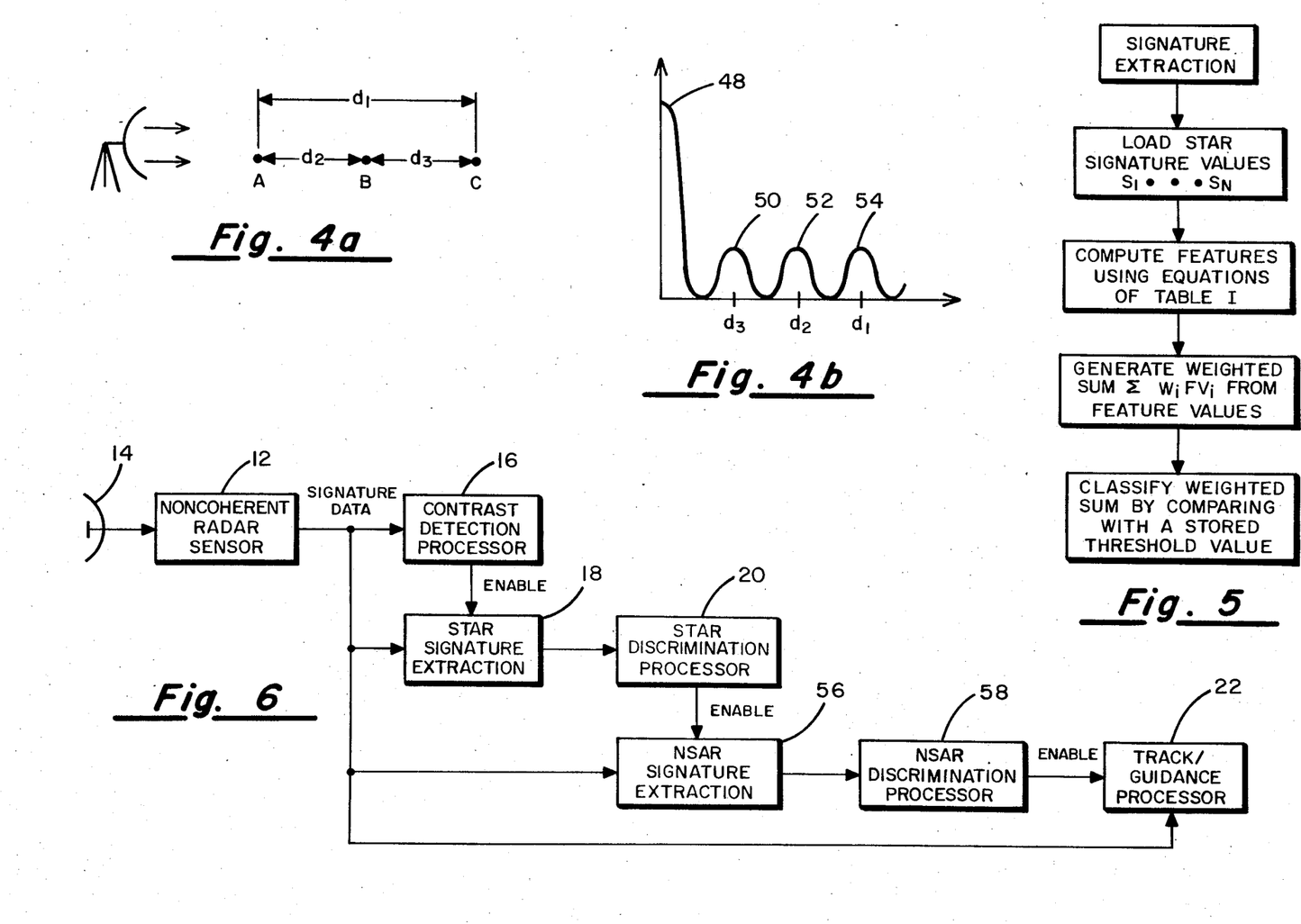
FIGS. 4(a) and 4(b) illustrate schematically a target exhibiting three point scatterers and the autocorrelation signature thereof, respectively.
FIG. 5 is a flow diagram for the STAR discrimination processor.
FIG. 6 is a general block diagram of an alternative embodiment of the invention.

From the preceding discussion, it is to be especially noted that STAR signatures preserve both distance and amplitude related features of scatterer pairs in the range profile. FIG. 4 illustrates a 3-point scatterer array (scatterers A, B and C) while the curve of FIG. 4(b) represents the corresponding autocorrelation signature for that array. It can be readily observed that in the STAR domain, distance is measured from the origin, or the zero lag term, whereas in the range profile domain, distance is measured between a pair of scatterers. Furthermore, in the autocorrelation signature, a peak is produced for each possible point pair combination. Thus, in FIG. 4(b), peak 48 represents scatterer self-correlation while correlation peaks 50, 52 and 54, respectively, relate to B-C, A-B and A-C interaction. In that the scatterers in FIG. 4(a) are all assumed to be of equal reflective strength, the peaks 50, 52 and 54 are of equal amplitude. In cases where each of the scatterers may be of a different reflectivity, the peaks will be of different amplitude but in each case, the distance and amplitude characteristics of the signatures are directly related to the physical characteristics of the target being scanned by the radar. It is the amplitude and spatial relationship between the peaks in the signature which lead to reliable target discrimination.

In performing the task of target discrimination, pattern recognition techniques are applied to the STAR signatures emanating from the discrete Fourier transform module 36 of FIG. 2 which is the STAR signature extraction module 18 of FIG. 1. A comparison is made between stored patterns relating to known targets and the radar derived signatures to determine whether a valid target is in view or whether natural clutter or possibly man-made false targets are being scanned. A two-stage pattern recognition process is preferably employed. First, discriminating features are extracted from the STAR signature and, secondly, these discriminating features are presented to the pattern classifier logic responsible for making the discrimination decision.

FIG. 5 is a flow diagram for the STAR discrimination processor. The NSAR processor would be very similar. A standard microprocessor may be used to execute the software. First, the STAR signature values, in digital words, are loaded into the microprocessor. The software for computing the feature values, e.g., D.C., peaks, mean, etc. are used to determine numerical values. A subset of the features listed in Table I is usually sufficient to give good classifier performance. The specific subset is selected through analysis of field test data. A classifier algorithm then manipulates and classifies a weighted sum with a stored reference threshold. It is understood that many different feature value formulas are possible and that several different classifier logics, e.g. nearest neighbor, polynominal, piecewise linear, etc., are possible embodiments of the discrimination processor.

It has already been shown that the STAR signatures are the full equivalent of the autocorrelation of the target range-profile. Thus, the signatures are physically related to the target, conveying both interscatterer distances and radar cross-section magnitude information. The features extracted from the STAR signature preserve both the distance and the amplitude information. To reduce dimensionality and, therefore, classifier complexity, the aforementioned feature extraction process is performed. In their simplest form, "features" comprise numbers characterizing the STAR signatures. Set forth below in Table I is a listing of 17 different features which may be used to distinguish signatures for various targets and in differing background clutter environments. In a typical example, the features pertaining to an armored vehicle, such as a tank, are different from those of a truck and, assuming the features, characteristic of each, are stored in the processor's memory, a comparison can be made between the signatures being obtained in a real-time mode with the prestored features to determine whether the target is, in fact, a tank or a truck.

TABLE I

STAR Signature Feature Set

| Feature Number | Feature Name | Definition | Comments |
|---|---|---|---|
| 1 | DC | $S_1$ | Average return level |
| 2 | Peak | $\max\{S_i, i = 2, 32\}$ | Peak point pair RCS |
| 3 | Mean | $\frac{1}{31} \sum_{i=2}^{32} S_i$ | Mean point pair RCS |
| 4 | STD | $\left[\frac{1}{31} \sum_{i=2}^{32} (S_i - \text{mean})^2\right]^{\frac{1}{2}}$ | Standard deviation point pair RCS |
| 5 | $S_1$ | $\sum_{i=2}^{16} S_i$ | Sum of point pair RCS in short distance band |
| 6 | $S_2$ | $\sum_{i=17}^{32} S_i$ | Sum of point pair RCS in long distance band |
| 7 | PSTD | Peak/STD | Peak-to-standard deviation ratio point pair RCS |
| 8 | PKMN | Peak/Mean | Peak-to-mean ratio point pair RCS |
| 9 | PKS1 | Peak/S1 | Peak-to-(Sum of short distance band) point pair RCS |
| 10 | PKS2 | Peak/S2 | Peak-to-(sum of long distance band) point pair RCS |
| 11 | MSTD | Mean/STD | Mean-to-(Standard deviation) ratio point pair RCS |
| 12 | S1S2 | S1/S2 | (Short distance band)-to-(long distance band) ratio |
| 13 | SD12 | $\left[\dfrac{\sum_{i=2}^{16}\left(S_i - \frac{1}{15}\sum_{i=2}^{16} S_i\right)^2}{\frac{16}{15}\sum_{i=17}^{32}\left(S_i - \frac{1}{16}\sum_{i=17}^{32} S_i\right)^2}\right]^{\frac{1}{2}}$ | (Standard deviation short distance band)-to-(standard deviation long distance band) point pair RCS |
| 14 | CG | $\sum_{i=2}^{32} iS_i / \sum_{i=2}^{32} S_i$ | Distance weighted average point pair RCS |
| 15 | MNDV | $\sum_{i=2}^{32} |i - CG|S_i / \sum_{i=2}^{32} S_i$ | Median deviation point pair RCS |
| 16 | SKW | $\sum_{i=2}^{32} (i - CG)^3 S_i / \left[\sum_{i=2}^{32} (i - CG)^2 S_i\right]^{3/2}$ | Skewness point pair RCS |

TABLE I-continued

STAR Signature Feature Set

| Feature Number | Feature Name | Definition | Comments |
|---|---|---|---|
| 17 | KURT | $\sum_{i=2}^{32} (i - CG)^4 S_i / \left[ \sum_{i=2}^{32} (i - CG)^2 S_i \right]^2$ | Kurtosis point pair RCS |

While the Super TArget Resolution system of FIG. 1 can advantageously be used to discriminate between targets of different kinds, even in the presence of clutter-generated noise, the system can be expanded and enhanced in its capabilities in accordance with the embodiment depicted by the block diagram of FIG. 6. The alternative system embodies STAR signature extraction of FIG. 1 but adds to it a two-dimensional Noncoherent Synthetic Aperture Radar (NSAR) signature. With STAR, signatures are generated by the changing interference between radar scatterers as the transmitted frequency is varied. In the case of NSAR image processing, signatures are generated by the changing interference between scatterers as both frequency and aspect angles are changed. Displacement of the radar relative to the target creates the well-known synthetic aperture effect. The displacement is in a direction perpendicular to the line of sight, i.e., cross-range. This, along with the high resolution in the range dimension occasioned by the step-wise variation in transmitter frequency, develops a high resolution two-dimensional image signature with MMW frequency. For example, at 35 GHz frequency, it is only required that the radar move approximately 1° about the target to develop a cross-range resolution of one foot.

The same noncoherent radar system depicted in FIG. 2 for the STAR technique is also used to generate NSAR images. The basic difference between the systems shown in FIGS. 1 and 6 is that, in the latter, STAR signatures are collected as the radar moves about the target and then a second Fourier transform over the angle samples is used to produce NSAR image. Stated more simply, NSAR processing makes use of both frequency diversity and varying aspect angle for signature generation.

Figure 7A:
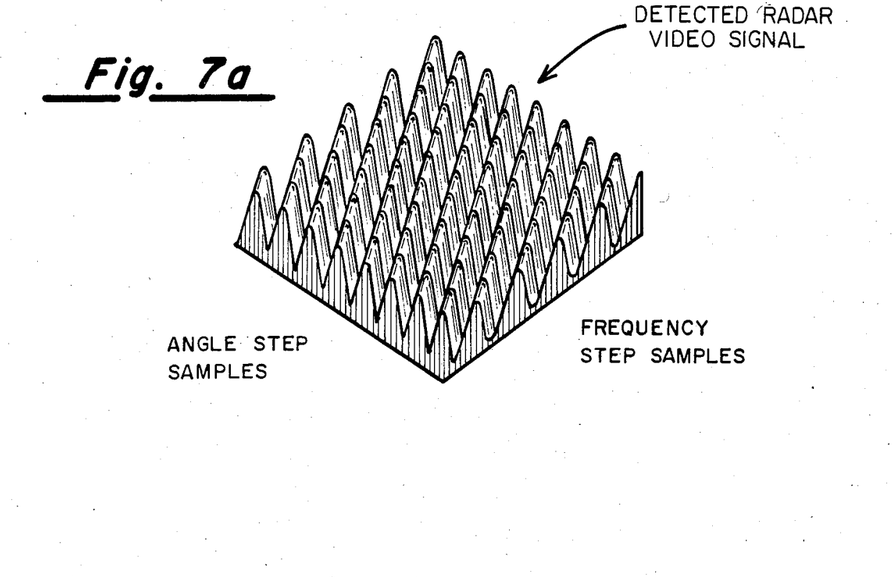
FIGS. 7(a) and 7(b) show the raw NSAR signature for a two-point target illustrated in FIG. 7(c) and the two-dimensional Fourier transform thereof, respectively.
Figure 7B:
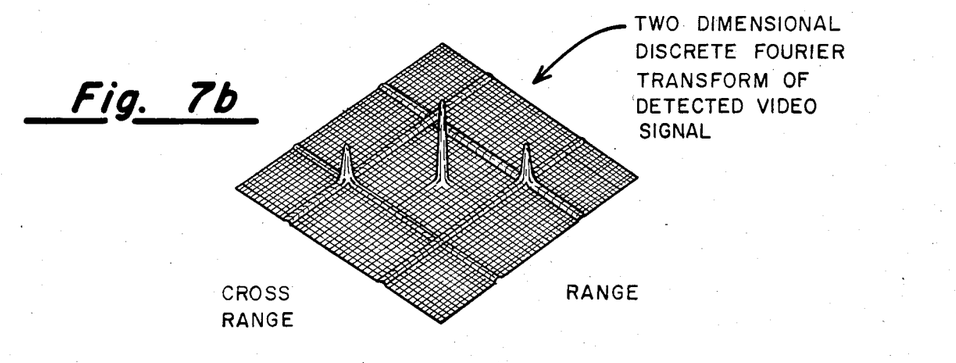
Figure 7C:
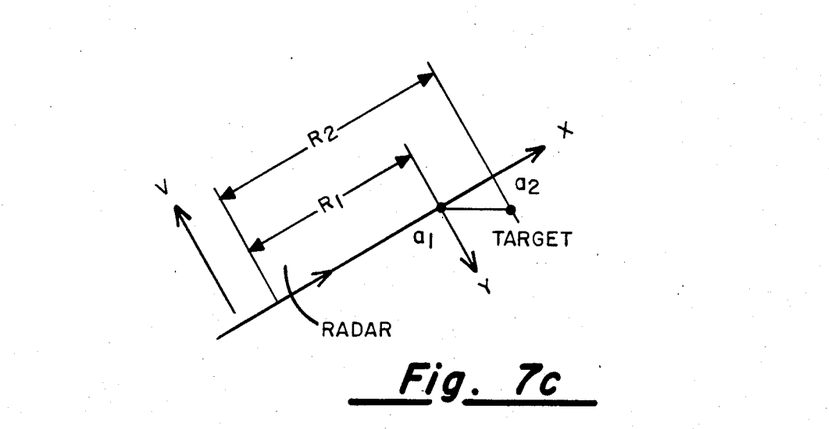

Referring to FIG. 7(a), there is illustrated the raw NSAR signature for the 2-point target shown in FIG. 7(c). The two-dimensional raw data are a series of sinusoidal waves in both the frequency-step (range) axis and the angle-step (cross-range) axis. The frequency-step data are identical to the STAR data described previously and are the result of waveform interference phenomena occasioned by the step-wise variation in transmitter frequency. As has been described, in the range axis, the resonance frequency is proportional to the range difference between the 2-point scatters $a_1$ and $a_2$. To obtain the angle-step data, the seeker containing the radar flys around the target collecting successive raw STAR signatures. As the aspect angle changes due to the movement of the seeker with respect to the target, the relative phase of the returns from each scatterer also changes. The series of phase changes, as the seeker observes the target from slightly different angles, comprises a cross-axis resonance signal similar in nature to that of FIG. 3. The sinusoidal signal along the angle-step axis comprises the constructive and destructive interference signal between the two scatterers $a_1$ and $a_2$. The frequency variation is proportional to scatterer cross-range difference $(Y_2-Y_1)$ shown in FIG. 7(c).

As was the case with the STAR processor, the raw data are converted into a NSAR image by a two-dimensional discrete Fourier transformation. In the NSAR domain, a two scatterer target produces a three peak autocorrelation image. One peak is at the origin and the other two are spaced at $\pm(X_2-X_1)$ in the range dimension and at $\pm(Y_2-Y_1)$ in the cross-range dimension. See the waveform pattern of FIG. 7(b).

Figure 8A:
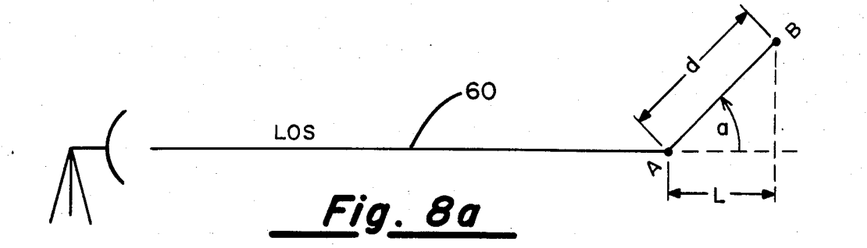
FIGS. 8(a) and 8(b) are diagram representations of the geometry involved in deriving equations helpful in understanding the operational theory of the embodiment of FIG. 6.
Figure 8B:
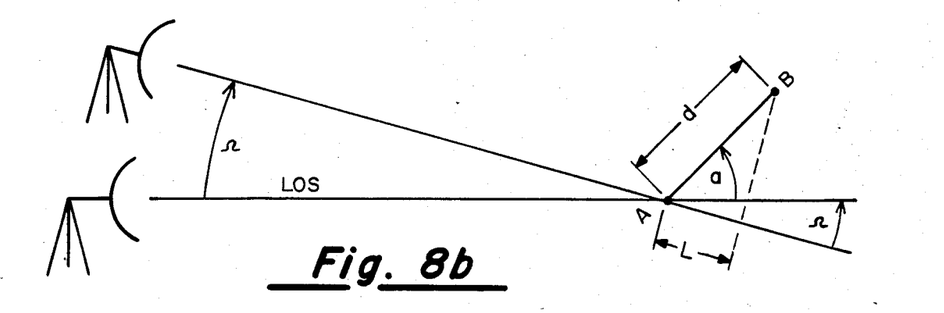

In the same fashion that it was possible to derive the resonant frequencies in the case of a two scatterer target in explaining the STAR signature extraction operation, it is also instructive to derive the resonance frequencies in the case of the Noncoherent Synthetic Aperture Radar (NSAR) target detection and classification system. The NSAR data collection geometry is represented schematically in FIGS. 8(a) and 8(b). In each case, the line segment connecting the two point scatterers A and B is at an angle $\alpha$ with respect to the radar line of sight 60.

As indicated by equation 4, supra, the pulsed polyfrequency return from two point scatterers may be represented as a continuous function of RF frequency f and an aspect angle $\alpha$. More particularly:

$$S(f,\alpha) = A^2 + B^2 + 2AB \cos(w\,q) \qquad 5$$

$$w = 2\pi f$$

$$q = \frac{2d \cos(\alpha)}{c}.$$

The resonant function phase argument is:

$$\phi = 2\pi f q = \frac{2\pi f 2d \cos(\alpha)}{c}. \qquad 6$$

The range axis resonant frequency can be expressed as:

$$f_s = \frac{1}{2\pi} \frac{d\phi}{df} = \frac{2d \cos(\alpha)}{c}. \qquad 7$$

The cross-range resonant frequency is then:

$$f_x = \frac{1}{2\pi} \frac{d\phi}{d\alpha} \frac{2fd}{c} \sin\alpha = \frac{2\,d \sin\alpha}{\lambda}. \qquad 8$$

Examining equations 7 and 8 for $f_s$ and $f_x$ reveals that these resonant frequencies in the raw two-dimensional signature appear as coordinates in the NSAR image, where $f_s$ is proportional to range spacing and, similarly, $f_x$ is proportional to the cross-range spacing. Furthermore, it can also be shown that the range component of the NSAR image is always along the radar line-of-sight (LOS) and the cross-range component is in the plane defined by the seeker's velocity vector and the LOS and is perpendicular to the range component. Furthermore, it is not required that the seeker fly directly over nor directly around the target to develop a NSAR signature.

Figure 9A:
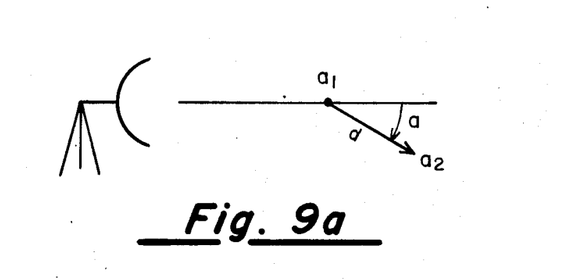
FIGS. 9(a) and 9(b) are, respectively, a schematic diagram of a two point scatterer and a depiction of the autocorrelation function of the radar returns therefrom.
Figure 9B:
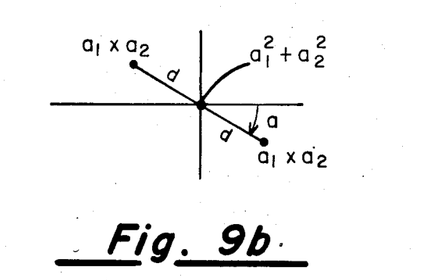

Having provided the geometry involved, attention will next be directed to the nature of the NSAR signature which, as will be shown in more detail below, is equivalent to a two-dimensional autocorrelation function of the target radar cross-section (RCS), range and cross-range profiles. FIG. 9(b) illustrates the results of directly computing the autocorrelation function for the two point target illustrated in FIG. 7(c) and is to be compared with the NSAR image or signature illustrated in FIG. 7(b). From FIG. 7(b), it can be seen that all of the target information is contained in one-half of the plane of the NSAR image and that this image is always centered on the origin since it is an autocorrelation function.

Again assuming a two point target at points i and j, respectively, the Geometric Brightness, $B_i$ can be expressed as:

$$B_i = \sqrt{\sigma_i \sigma_k} \qquad 9.$$

where $\sigma_i$, $\sigma_j$ are the radar cross-sections of points i and j, respectively.

The Point Pair Spacing or Radius can be computed using the equation:

$$R_i = ((X_i - X_j)^2 + (Y_i - Y_j)^2)^{\frac{1}{2}} \qquad 10.$$

Where $X_i$ is range location and $Y_i$ is the cross range location of $\sigma_i$, and similarly for $X_j$ and $Y_j$.

The Point Pair Angle with respect to the radar line of sight is:

$$A\phi_i = \arctan(Y_i/X_i). \qquad 11.$$

The foregoing information is easily represented by means of a vector $(B, R, \theta)_i$ for each pixel in the image. (See FIG. 10) That is to say, each NSAR point can be described by a vector of its brightness, radius and angle.

When describing the STAR target detection system, it was shown that the range resolution, $\Delta R$ is inversely proportional to the bandwidth of the modulation waveform, i.e., $\Delta R = c/2B$. This equation applies equally well to the NSAR images along the frequency-step dimension. The cross range resolution, $\Delta XR$, can be computed either from a doppler or from a synthetic aperture point of view. In each instance, it can be shown to be equal to $\lambda R/2D$. When it is recognized that the observation angle span $\Omega = D/R$, the expression for the cross range resolution reduces to:

$$\Delta XR = \frac{\lambda}{2\Omega}. \qquad 12.$$

In forming a NSAR signature, parameters are chosen such that the cross range resolution is approximately equal to the range resolution. Typically, the modulation signal bandwidth, B, is set at 500 MHz to provide a 0.3 meter (1 ft.) range resolution. To duplicate this resolving capability in the cross-range dimension, the appropriate observation angle, if calculated, turns out to be approximately 0.8° at a frequency of 35 GHz to obtain a 0.3 m cross-range resolution.

The embodiment of FIG. 6 describing the Noncoherent Synthetic Aperture Radar to provide target discrimination in high clutter, yields high range and cross range resolution images of a target. The addition of the second spatial dimension, i.e., cross-axis resolution, greatly enhances the ability to reject clutter and thereby reduce false alarm rates. As indicated by block 58 in FIG. 6, discrimination between target and clutter can be achieved using statistical plust syntactic pattern recognition techniques on the two-dimensional NSAR image. Operating on these high resolution images, the pattern classifier also has the potential to classify targets, for example, separating trucks from tanks. The statistical NSAR image processing/pattern recognition (discrimination) is preferably a two-stage process similar to that described by the flow chart of FIG. 5. In the first stage, features are extracted from the image and then, in the second stage, these features are presented to the NSAR discrimination processor which functions to compare the features to the real-time processed images so that the discrimination/classification decision can be made.

It was already illustrated above that the NSAR image is equivalent to the autocorrelation of the target's range, cross-range and radar cross-section profile and are thus physically related to the target and convey inter-scatterer distance and orientation information as well as scatterer brightness information. The feature extracted during NSAR image processing are selected to measure the distance, orientation and brightness information in the image. Thus, an understanding of the autocorrelation characteristic of the NSAR image is required if only those features physically related to the target are to be defined.

Set out in Table II below are a selection of typical features which have been used to discriminate and classify certain targets.

TABLE II
NSAR SIGNATURE FEATURE SET

| Feature Number | Feature Name | Definition | Comments |
|---|---|---|---|
| 1 | $R_{20}$ | $\dfrac{\sum_{i=2}^{21} B_i R_i}{\sum_{i=2}^{21} B_i}$ | Brightness weighted average radius of the 20-brightest points excluding the one at the origin. This feature is a measure of the spatial spread of the scatterers. Targets will give a low value of $R_{20}$. Clutter will give a high value since the points are spread out in space. |
| 2 | $XR_{20}$ | $\dfrac{\sum_{i=2}^{21} B_i |X_i|}{\sum_{i=2}^{21} B_i}$ | Brightness weighted average x cartesian coordinates of the twenty brightest points excluding the origin. This feature measures spatial spread along the radar line of sight. |
| 3 | $YR_{20}$ | $\dfrac{\sum_{i=2}^{21} B_i |Y_i|}{\sum_{i=2}^{21} B_i}$ | Brightness weighted average y cartesian coordinate of the twenty brightest points excluding the origin. This feature measures spatial extent perpendicular to the line-of-sight. |

Figure 10:
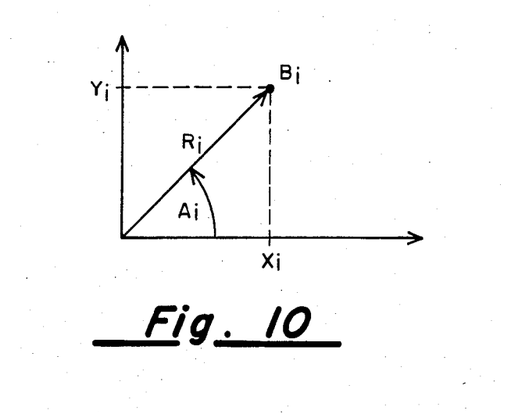
FIG. 10 is a vector representation of a NSAR image.

These features are based on the NSAR image representation shown in FIG. 10, wherein the $i^{th}$ brightest point in the image is identified as $B_i$ and where $R_i$, $A_i$, $X_i$ and $Y_i$ are the polar and Cartesian coordinates of the point $B_i$.

The above feature set gathered from known targets forms a part of the data base accessible by the NSAR discrimination processor 58 of FIG. 6 and, using known pattern recognition algorithms familiar to those skilled in the art, the processor operates on NSAR signatures or images on a real-time basis to determine the best fit between the features of the unknown signature with the features already stored in the processor's data base. In this way, not only can targets of interest be located in a high clutter environment but, in many instances, the target type itself can be classified.

Thus, there has been described two embodiments of target location and discrimination systems which provide an improved means for detecting targets in high clutter environments while maintaining false alarm rates at acceptably low levels. Furthermore, the signal processing techniques described herein offer the foregoing capability without requiring highly complex and costly RF sensors which are required by known coherent and/or polarimetric approaches and not requiring complex and costly motion compensation equipment which are required by known coherent approaches.

Various modifications and changes may be made to the embodiments described herein without departing from the spirit or scope of the invention. For example, rather than employing a pulsed polyfrequency radar, such as shown in FIG. 2 hereof, a conventional frequency modulated, continuous wave radar may be used. Here, the STAR signature is recovered by sampling the video detector output in time. The time samples are equivalent fo frequency samples when a linear FM modulation is used. The sampled output of the video detector is then range gated and applied to the Fourier transform module.

Another modification may employ only a narrowband radar, using a constant carrier pulse, but obtaining high cross-range resolution by flying over or around the target. This is a one-dimensional cross-range autocorrelation signature. The Fourier transform processing would still be used to obtain the signature from the angle sampled data and very similar features and classifier logic would be employed to decide on the presence of the target.

Recognizing, then, that the above-described embodiments of the invention are illustrative only, and that modification thereof may occur to those skilled in the art, this invention is not to be limited to the embodiments disclosed herein, but is to be limited only as defined by the appended claims.

What is claimed is:

1. Apparatus for extracting one-dimensional, high-resolution information from radar return signals, comprising:
    (a) non-coherent pulse radar means for transmitting N sequential signals of differing frequency at predetermined time intervals toward a given target area of interest from one radar location;
    (b) non-coherent radar receiver means positioned to receive, detect and range gate the composite radar return signal samples of N differing frequencies reflected from a plurality of point scatterers located in said area of interest, wherein N is an integer greater than or equal to the ratio of radar pulse length to range resolution capability;
    (c) means for detecting the varying D.C. interference signal of said radar return signal samples from stationary targets occasioned by the differing frequencies at one radar location; and
    (d) means for performing a one-dimensional Fourier transformation on the detected and range gated composite non-coherent radar return signal samples of N different frequencies whereby high resolution target signature features become detectable.

2. Apparatus for extracting one-dimensional, high-resolution information from radar return signals, comprising:
    (a) non-coherent pulse radar means for transmitting N sequential signals of the same frequency at predetermined time intervals toward a given target area of interest from N plural angle radar locations where N is an integer greater than or equal to the ratio of radar pulse length to range resolution capability;
    (b) non-coherent radar receiver means positioned to receive, detect and range gate the composite radar return signal samples of the single frequency reflected from a plurality of point scatterers located in said area of interest;
    (c) means for detecting the varying D.C. interference signal of said radar return signal samples from stationary targets occasioned by the movement of the transmitting means from one to another of said plural angle locations; and
    (d) means for performing a one-dimensional Fourier transformation on the detected and range gated radar return signal samples of the single frequency from N different angle locations whereby high resolution target signature features become detectable.

3. Apparatus for extracting two-dimensional, high-resolution information from radar return signals, comprising:
    (a) non-coherent pulse radar means for transmitting N sequential signals of differing frequencies at predetermined time intervals toward a given target area of interest from N plural angle radar locations, N being an integer greater than one;
    (b) radar receiver means positioned to receive, detect and range gate the composite non-coherent radar return signal amplitude samples of the N differing frequencies reflected from a plurality of point scatterers located in said area of interest;
    (c) means for detecting the varying D.C. interference signal of said non-coherent radar return signals from stationary targets occasioned by both the differing frequencies at one radar location and the movement of the transmitting means from one to another of said plural angle locations; and
    (d) means for performing a two-dimensional Fourier transformation on the detected and range gated non-coherent radar return signal samples of the N different frequencies and N different angle locations whereby high resolution target signature features become detectable.

4. Apparatus as in claims 1, 2 or 3 and further including pattern recognition means for detecting the presence of a valid target in a high clutter background, said pattern recognition means comprising:
    (a) means for deriving from the Fourier transform of said detected non-coherent radar return signals a plurality of features characteristic thereof;
    (b) means for manipulating and comparing the derived features with known features characteristic of known potential targets and clutter; and
    (c) means for determining the best match between said derived features and said known features, whereby the presence of a valid target can be discerned.

5. Apparatus as in claims 1, 2 or 3 and further including pattern recognition means for classifying the target type, said pattern recognition means comprising:
   (a) means for deriving from the Fourier transform of said detected non-coherent radar return signals a plurality of features characteristic thereof;
   (b) means for manipulating and comparing the derived features with known features characteristic of known target types; and
   (c) means for determining the best match between said derived features and said known features, whereby the target type can be selected.

6. A method for extracting one-dimensional, high-resolution target signature features from non-coherent radar return signals, comprising the steps of:
   (a) transmitting N sequential signals of differing frequency as predetermined time intervals from a non-coherent pulse radar toward a given target area of interest from a single location, N being an integer greater than or equal to the ratio of radar pulse length to range resolution capability;
   (b) receiving, detecting and range gating the composite non-coherent radar return signal samples of N differing frequencies reflected from a plurality of stationary point scatterers located in said area of interest;
   (c) detecting the varying D.C. interference signal of said non-coherent radar return signal samples occasioned by the differing frequencies at said one location; and
   (d) performing a one-dimensional Fourier transformation on said detected and range gated composite non-coherent radar return signal samples of N different frequencies for enhancing the detectability of said high resolution target signature features.

7. A method for extracting one-dimensional, high-resolution information from radar return signals comprising:
   (a) transmitting N sequential signals of the same frequency at predetermined time intervals from non-coherent pulse radar means toward a given target area of interest from N plural angle radar locations, N being an integer greater than one;
   (b) receiving, detecting and range gating the composite non-coherent radar return signal samples of the single frequency reflected from a plurality of point scatterers located in said area of interest;
   (c) detecting the varying D.C. interference signal of said radar return signal samples from stationary targets occasioned by the movement of said non-coherent pulse radar means from one to another of said plural angle locations; and
   (d) performing a one-dimensional Fourier transformation on the detected and range gated non-coherent radar return signal samples of the single frequency from N different angle locations whereby high resolution target signature features become detectable.

8. A method for extracting two-dimensional, high-resolution information from radar return signals, comprising the steps of:
   (a) transmitting N sequential signals of differing frequencies at predetermined time intervals from non-coherent pulse radar means toward a given target area of interest from N plural angle radar locations where N is an integer greater than or equal to the ratio of radar pulse length to range resolution capability;
   (b) receiving, detecting and range gating the composite non-coherent radar return signal samples of the N differing frequencies reflected from a plurality of point scatterers located in said area of interest;
   (c) detecting the varying D.C. interference signal of said radar return signal samples from stationary targets occasioned by both the differing frequencies at one radar location and the movement of said non-coherent pulse radar means from one to another of said plural angle locations; and
   (d) performing a two-dimensional Fourier transformation on the detected and range gated radar return signal samples of the N different frequencies and N different angle locations whereby high resolution target signature features become detectable.

9. The method as in claims 6, 7 or 8 and further including the steps of:
   (a) manipulating and comparing said target signature features with known features characteristic of known potential targets and clutter; and
   (b) determining the best match between said target signature features and said known features, whereby the presence of a valid target can be discerned.

* * * * *